Oct. 19, 1926.
J. R. BINGAMAN
SEAT COVER
Filed May 25, 1926
1,603,896
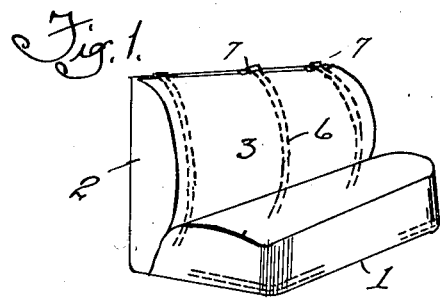
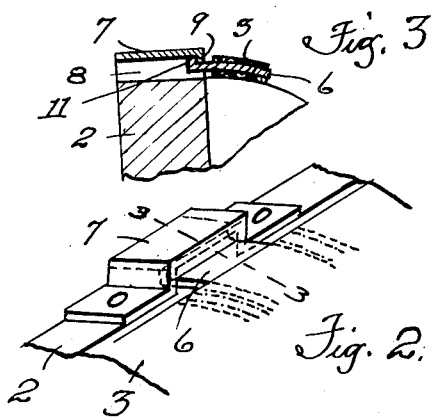
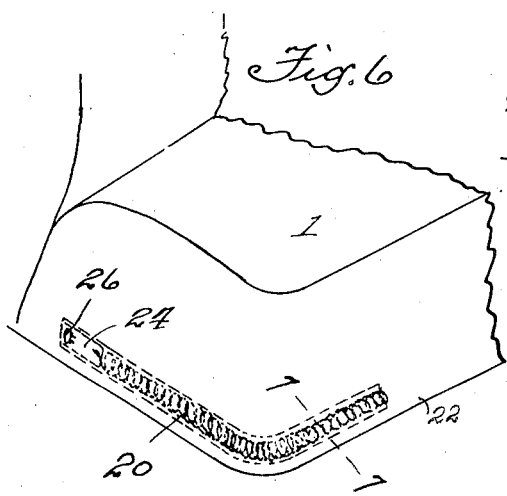
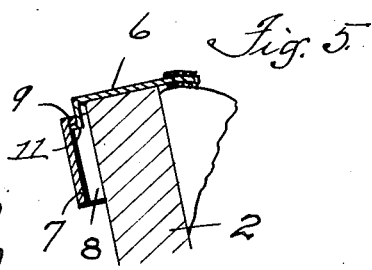
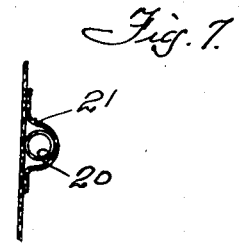
John R. Bingaman, Inventor
By ———— Attorney Patented Oct. 19, 1926.

1,603,896

UNITED STATES PATENT OFFICE.

JOHN R. BINGAMAN, OF WEST READING, PENNSYLVANIA.

SEAT COVER.

Application filed May 25, 1926. Serial No. 111,494.

This invention relates to improvements in detachable seat covers and it is intended more particularly for use on seats of automobiles.

The object in the present instance is to provide a seat cover capable of easy and quick removal and one in which the use of nails and other objectionable fastening means is eliminated.

The invention contemplates a seat cover having a plurality of spring members carried thereby and suitable engaging means for the said spring members attached to the seat back.

The invention is more fully described in the following specification and clearly illustrated in the accompanying drawing, in which:—

Figure 1 is a perspective view of a seat with my cover in position thereon.

Figure 2 is an enlarged view showing one of the spring engaging members located on the top of the seat back with the spring member in engagement therewith.

Figure 3 is a cross-section through 3—3 of Fig. 2.

Figure 4 is a detail view showing the spring member in one of the pockets of the seat cover.

Figure 5 shows a slight modification, the spring engaging member being located on the back of the seat, near the top.

Figure 6 shows a portion of the base member of the seat with the coil spring and clip for holding the cover on that portion of the seat.

Figure 7 is a section through 7—7 of Fig. 6.

The numeral 1 designates the base member and 2 the back member of a vehicle seat. 3 designates the cover for the back member, which has a plurality of pockets 4, vertically arranged, and in which is located a plurality of spring members 6.

The numeral 7 designates the spring engaging members, secured to the top edge or the back of the seat, as disclosed in Figures 2 and 5 respectively.

These spring engaging members are secured to the seat by screws or other suitable means, and each is formed with a recess 8 and an internal ledge 9 at its forward end.

The spring members 6 are each formed with an up-set extremity 11, adapted to engage the engaging members at the ledges 9.

When the engaging member is used on the rear seat of a vehicle, it is placed on the top edge thereof, as shown in Figure 2, while its application to the front seat is at the rear and in close proximity to the top edge. In the latter case the spring is formed with a right angled up-set extremity as shown in Figure 5, the engagement with the engaging member being the same as that shown in Figure 2.

These springs are slipped into pockets 4 formed in the cover, and the projecting ends are slipped into engagement with the engaging members, and the lower end of the cover, with the spring members therein, is placed in position and the base member of the seat is pushed into position and holds it in place, as shown in Figure 1.

The securing means for the cover of the base member, as disclosed in Figure 6, comprises a coil spring 20, encased in a pocket 21 in the cover 22, and this spring is provided with a perforated plate 24 at its end, and a fastening screw 26 secures it to the body of the seat cover. Both forward corners of the base member cover are provided with these coil springs, and when the cover is slipped on the base member, the springs will hold it securely in position.

Having thus fully described my invention, what I claim and desire to secure by Letters Patent is:—

A seat cover comprising a cover portion of any suitable material, formed with vertical pockets, spring plates located in the pockets, the extremities of said spring plates being up-set; in combination with a seat back, a plurality of spring plate engaging members located thereon, each having a recess to receive the end of one of the plates and a ledge to engage the upset end thereof.

In testimony whereof I affix my signature.

JOHN R. BINGAMAN.